United States Patent
Kawano et al.

(10) Patent No.: US 9,793,849 B2
(45) Date of Patent: Oct. 17, 2017

(54) INVERTER APPARATUS FOR POLYPHASE AC MOTOR DRIVE

(71) Applicant: Mitsubishi Electric Corporation, Tokyo (JP)

(72) Inventors: Yu Kawano, Tokyo (JP); Takahiro Okanoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/324,913

(22) PCT Filed: Sep. 9, 2014

(86) PCT No.: PCT/JP2014/073791
§ 371 (c)(1),
(2) Date: Jan. 9, 2017

(87) PCT Pub. No.: WO2016/038683
PCT Pub. Date: Mar. 17, 2016

(65) Prior Publication Data
US 2017/0201204 A1    Jul. 13, 2017

(51) Int. Cl.
*H02P 7/08*    (2006.01)
*H02P 29/024*    (2016.01)
(Continued)

(52) U.S. Cl.
CPC ........ *H02P 29/0243* (2016.02); *H02M 1/084* (2013.01); *H02M 7/537* (2013.01); *H02P 6/16* (2013.01); *H02P 27/08* (2013.01)

(58) Field of Classification Search
USPC ...... 318/563, 400.21, 782, 801, 400.26, 478
See application file for complete search history.

(56) References Cited

U.S. PATENT DOCUMENTS

2010/0036555 A1    2/2010  Hosoda et al.
2010/0315024 A1    12/2010 Najima et al.
(Continued)

FOREIGN PATENT DOCUMENTS

JP    2003-189633 A    7/2003
JP    2003-219677 A    7/2003
(Continued)

OTHER PUBLICATIONS

International Search Report for PCT/JP2014/073791 dated Dec. 9, 2014.

*Primary Examiner* — Jorge L Carrasquillo
(74) *Attorney, Agent, or Firm* — Sughrue Mion, PLLC; Richard C. Turner (57) ABSTRACT

In view of the problem that an existing technique can detect a failure in an arm circuit for each phase and continue motor drive by only a normal phase, but a brake torque is generated due to a closed circuit of the faulty phase, an inverter apparatus for polyphase AC motor drive is provided that includes: a first power supply switching device in a power supply line to an inverter circuit; a second power supply switching device for each phase in the arm circuit of the inverter circuit, and a motor relay switching device in an output path from each phase, wherein the parasitic diodes of the first power supply switching device and second power supply switching device have directional characteristics different from each other, which prevent generation of a closed circuit.

15 Claims, 4 Drawing Sheets

(51) Int. Cl.
  *H02P 27/08*  (2006.01)
  *H02P 6/16*   (2016.01)
  *H02M 7/537*  (2006.01)
  *H02M 1/084*  (2006.01)

(56) References Cited

U.S. PATENT DOCUMENTS

| | | | |
|---|---|---|---|
| 2012/0074885 A1 | 3/2012 | Hirono | |
| 2013/0090809 A1* | 4/2013 | Kuroda | B62D 5/0481 |
| | | | 701/41 |
| 2013/0141871 A1* | 6/2013 | Omae | B62D 5/0406 |
| | | | 361/709 |
| 2013/0277138 A1* | 10/2013 | Arai | B62D 5/04 |
| | | | 180/443 |
| 2014/0055059 A1* | 2/2014 | Uryu | H02P 27/06 |
| | | | 318/9 |
| 2016/0028336 A1* | 1/2016 | Oyama | H02P 27/06 |
| | | | 318/564 |
| 2016/0325777 A1* | 11/2016 | Mori | H02P 25/22 |
| 2017/0166248 A1* | 6/2017 | Asao | B62D 5/0487 |

FOREIGN PATENT DOCUMENTS

| | | |
|---|---|---|
| JP | 2003-333862 A | 11/2003 |
| JP | 2008-220045 A | 9/2008 |
| JP | 2009-001055 A | 1/2009 |
| JP | 2010-279125 A | 12/2010 |
| JP | 2010-288369 A | 12/2010 |
| WO | 2013/183168 A1 | 12/2013 |

\* cited by examiner

INVERTER APPARATUS FOR POLYPHASE AC MOTOR DRIVE

CROSS REFERENCE TO RELATED APPLICATIONS

This application is a National Stage of International Application No. PCT/JP2014/073791 filed Sep. 9, 2014, the contents of all of which are incorporated herein by reference in their entirety.

TECHNICAL FIELD

The present invention relates to inverter apparatuses for polyphase AC motor drive, and particularly relates to an inverter apparatus for polyphase AC motor drive that can address a failure occurring in an inverter circuit.

BACKGROUND ART

A polyphase AC motor is used in various applications, including an electrically assisted power steering apparatus. The power supplied to the polyphase AC motor is controlled by an inverter apparatus for polyphase AC motor drive. The following explanation takes a three-phase AC motor as an example of the polyphase AC motor. An electrically assisted power steering apparatus reduces the required steering torque applied by a driver, which is configured by combining a power source, a motor, a sensor, an inverter apparatus for three-phase AC motor drive and a controller, and which is a system that uses the sensor to detect the direction and amount of the rotation angular velocity of a steering torque applied by the driver, then uses the inverter apparatus for three-phase AC motor drive to transform power from the power source to a required amount of power to be supplied to the motor, and then uses the motor to add an assist torque to the steering torque.

For the electrically assisted power steering apparatus in which the inverter apparatus for three-phase AC motor drive is used, conventionally, various measures against a failure occurring in the motor or inverter apparatus have been considered. Also, various failure detection methods have been proposed. When a failure is detected, a portion in which the failure has been detected will be isolated from the overall circuit configuration. In order to do that, for example, one method has been proposed in which a motor relay is provided between the U-, V- and W-phase coils of the motor and the U-, V- and W-phase arm circuits of the inverter circuit, respectively, for separating the inverter circuit from the faulty motor, and a power supply relay is provided between the invert apparatus and the power source for cutting off power supply. Indeed, quickly stopping the motor would be a measure against an overall systematic failure, but, stopping the motor causes a problem of largely changing the steering characteristics and requiring the driver to steer with more steering torque.

Therefore, a PTL 1 proposes a method in which, when a failure occurs in only one phase of the three phases of the motor, the phase in which the failure has occurred is determined in order to use the phases other than the faulty phase as an energized phase to continue motor drive and continue to add an assist torque to the steering.

As a premise of the proposal, it is disclosed that, when only one phase of the three-phase (U, V, W) motor coils is insufficiently energized, the two phases other than the insufficiently energized phase are used as an energized phase to continue motor control.

CITATION LIST

Patent Literature

[PTL 1] JP-A-2009-1055

SUMMARY OF INVENTION

Technical Problem

A measure to address a failure occurring in an arm circuit of the inverter circuit has been proposed in which the operation of the motor is monitored and a faulty phase is isolated by the motor relay so that a large fluctuation in the motor torque will not occur. However, the motor relay includes a parasitic diode and may also include a diode added to prevent reverse connection and utilize regenerative energy produced by motor rotation, which causes a problem in which the parasitic diode or added diode of the motor relay forms a closed circuit, and, when current flows in the closed circuit, a brake torque is applied to the motor.

In order to solve the above problem of brake torque generation, it is an object of the present invention to provide an inverter apparatus for polyphase AC motor drive in which, when a failure occurs in one phase of arm circuits of an inverter circuit, isolating only this faulty phase allows continuing motor drive with the remaining phases, and, only with as little additional parts as possible and the connection direction of the parts specified, generation of a closed circuit which causes a brake torque can be prevented.

Solution to Problem

In order to achieve the above object, the invention provides an inverter apparatus for polyphase AC motor drive including: an inverter circuit connected between a power source and a polyphase AC motor for converting power from the power source to polyphase AC power to be supplied to the polyphase AC motor; a first power supply switching device provided between the power source and the inverter circuit for opening/closing the electric path between the power source and the inverter circuit; a motor relay switching device provided between an output point of the inverter circuit for each phase and the polyphase AC motor for opening/closing the electric path between the output point and the polyphase AC motor; a second power supply switching device provided downstream of the first power supply switching device with respect to the power source for each phase of the inverter circuit; and a control circuit for performing switching control of the first power supply switching device, the second power supply switching device, the motor relay switching device and the inverter circuit, wherein a first diode is provided, connected in parallel with the first power supply switching device and in the forward direction with respect to the current supply direction, and a second diode is provided, connected in parallel with the second power supply switching device and in the reverse direction with respect to the current supply direction.

Furthermore, in the inverter apparatus for polyphase AC motor drive, when the second power supply switching device is placed upstream of the switching device of the upper arm circuit in the inverter circuit, a diode is connected in parallel with the motor relay switching device and in the direction to cause current to flow into a phase winding of the polyphase AC motor.

Furthermore, in the inverter apparatus for polyphase AC motor drive, when the second power supply switching device is placed downstream of the switching device of the lower arm circuit in the inverter circuit, a diode is connected in parallel with the motor relay switching device and in the direction to cause current to flow out of a phase winding of the polyphase AC motor.

Advantageous Effects of Invention

According to the invention, inserting a separate power supply switching device into each phase allows isolating the faulty phase and continuing motor drive only with the remaining phases, and defining the direction of the diodes connected in parallel with the power supply relay and motor relay switching device prevents generation of a closed circuit which causes a brake torque.

DESCRIPTION OF EMBODIMENTS

An inverter apparatus for polyphase AC motor drive in accordance with the present invention (hereinafter referred to as an inverter apparatus) is described with reference to the drawings, with respect to an electrically assisted power steering apparatus in which a three-phase AC motor (hereinafter referred to as a motor) is used. Note that, through the drawings, the same reference numerals denote the same or corresponding components.

First Embodiment

Figure 1:
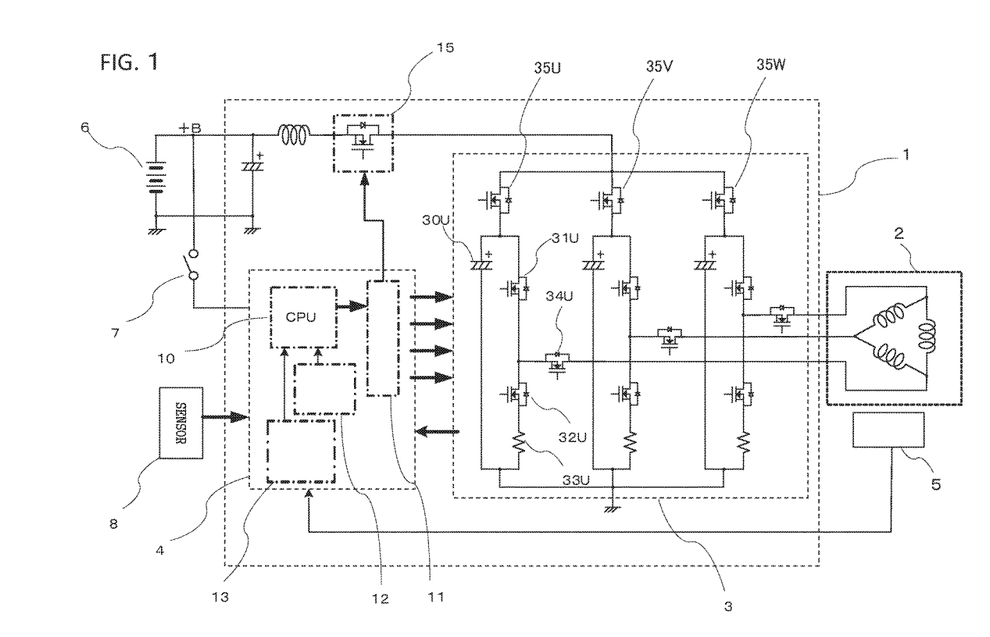
FIG. 1 An overall configuration circuit diagram of an electrically assisted power steering apparatus including an inverter apparatus for three-phase AC motor drive in accordance with a first embodiment.

FIG. 1 is an overall configuration circuit diagram of an electrically assisted power steering apparatus including an inverter apparatus of a first embodiment of the invention. In the electrically assisted power steering apparatus, an inverter apparatus 1 is configured to supply current to a motor 2 from a power source 6 loaded in a vehicle.

The inverter apparatus 1 includes an inverter circuit 3 and a control circuit 4. A rotation sensor 5 is provided to the motor 2. Information detected by the rotation sensor 5 is input to the control circuit 4. Between the power source 6 and the inverter circuit 3, an ignition switch 7 for starting the operation of the control circuit 4, a capacitor and coil as a noise measure in the power supply line (+B, −Ground) of the power source 6, and a first power supply switching device 15 having a relay function for switching ON/OFF current to the inverter circuit 3 are provided. The first power supply switching device 15 is, for example, a semiconductor device, FET. A parasitic diode included in the FET is placed in the forward direction with respect to the current supply direction, so, if the power source 6 is inadvertently connected in the reverse direction, current is cut off to achieve protection.

As shown in FIG. 1, the inverter circuit 3 includes two switching devices 31U, 32U in the upper/lower arm circuit for each phase of the three-phase windings (U, V, W) of the motor 2, or six switching devices in total (the reference numerals are shown only for the U-phase and not shown for the other phases because of the same reference numerals as the U-phase), and a motor relay switching device 34U having a relay function for opening/closing the electric path between the winding of the motor 2 and the switching devices 31U, 32U. Also, a capacitor 30U for noise suppression is connected for each arm circuit of U-, V- and W-phases. Also, a shunt resistor 33U for detecting a current flowing to the motor 2 is provided in the arm circuit for each phase. Furthermore, a second power supply switching device 35U is provided in the input side of the arm circuit for each phase. The second power supply switching device 35U can switch ON/OFF current input to the arm circuit for each phase.

The switching devices 31U, 32U provided in the inverter circuit 3 and the motor relay switching device 34U are semiconductor device, for example, an N-channel MOSFET, adjacent to which a parasitic diode is provided in the direction shown in the figure. Generally, a parasitic diode is not shown in a circuit diagram. But, in this figure, the parasitic diode is intentionally shown to facilitate understanding of the relation of source and drain which is represented by the direction of the diode instead of explicitly showing the relation of source and drain. The switching devices 31U, 32U provided in the upper arm circuit and lower arm circuit, respectively, and the motor relay switching device 34U are individually PWM (pulse width modulation) controlled based on a command from the control circuit 4, such that ON/OFF switching of the switching devices 31U, 32U of the arm circuit can convert DC power supplied from the DC power source 6 into AC power to be supplied to the three phases of the motor 2. Also, if the second power supply switching device 35U is configured using a semiconductor device such as FET, a parasitic diode included in the FET needs to be placed in the reverse direction with respect to the current supply direction to completely cut off current when the gate is turned OFF.

The control circuit 4 in the inverter apparatus 1 includes: a CPU 10 for calculating a control variable for current supplied to the windings of the motor 2 based on the information from a sensor 8, such as a vehicle speed sensor, a torque sensor for detecting steering torque and the like; a drive circuit 11 for controlling the switching operation of the first power supply switching device 15, the switching devices 31U, 32U provided in the arm circuit for each phase, the motor relay switching device 34U and the second power supply switching device 35U; a monitor circuit 12 for detecting a voltage or current at various points in the inverter circuit 3; and a rotation angle detection circuit 13 for receiving a signal from the rotation sensor 5.

In the control circuit 4, the CPU calculates the amount of current to be supplied to the windings of the motor 2 based on the information input from the sensor 8 and outputs the calculated result to the drive circuit 11, then the drive circuit 11 outputs a signal to the switching devices 31U, 32U, 34U, 35U of the inverter circuit 3. In the inverter circuit 3, the switching devices 31U, 32U, 34U, 35U of each phase are driven based on a drive signal from the drive circuit 11, then a current flows in the winding of each phase of the motor 2. Also, the supplied current value is detected by the monitor circuit 12, then the feedback control is performed based on the difference between the value calculated by the CPU 10 (target value) and the detected value. At the same time, the drive circuit 11 controls the first power supply switching device 15 and causes the CPU 10 to calculate the rotational position and speed of the motor 2 using the rotation sensor 5 and the rotation angle detection circuit 13. Note that the explanation is made with respect to the U-phase, but would also apply to the V- and W-phases.

In the inverter apparatus configured as above, it is assumed that a failure, especially a short-circuit failure, occurs in a switching device of the inverter circuit 3. The failure detection is performed by detecting a current based on the voltage across the shunt resistor 33U connected in series with the circuit. That is, a faulty phase can be determined by comparing a current value obtained for each phase to a reference value. When a faulty phase is determined in this way, the second power supply switching device 35U and motor relay switching device 34U of the faulty phase are turned OFF to completely isolate the faulty phase. That is, the connection is switched so that current will not flow into the circuit of the faulty phase even via the parasitic diode of the second power supply switching device 35U and also current will not flow out the circuit of the faulty phase even via the parasitic diode of the motor relay switching device 34U, in order to completely isolate only the faulty phase.

For example, if a failure occurs either the switching device 31U or 32U of the upper or lower arm circuit of the U-phase and the U-phase is determined as the faulty phase, the motor relay switching device 34U and the second power supply switching device 35U are turned OFF to allow the arm circuit of the U-phase of the inverter circuit 3 to be electrically isolated.

Similarly, if some kind of failure occurs in the capacitor 30U or wiring in the arm circuit of any phase, the motor relay switching device 34U and the second power supply switching device 35U are turned OFF to electrically isolate the faulty phase by phase.

Turning OFF the motor relay switching device 34U and the second power supply switching device 35U to electrically isolate the faulty phase from the inverter circuit 3 in this way eliminates formation of a closed circuit, which can prevent generation of a brake torque.

After the faulty phase is electrically isolated, the inverter circuit operates on the remaining two phases functioning well and continues inverter switching, thereby continuing to supply current to the motor 2 by two-phase drive.

Second Embodiment

Figure 2:
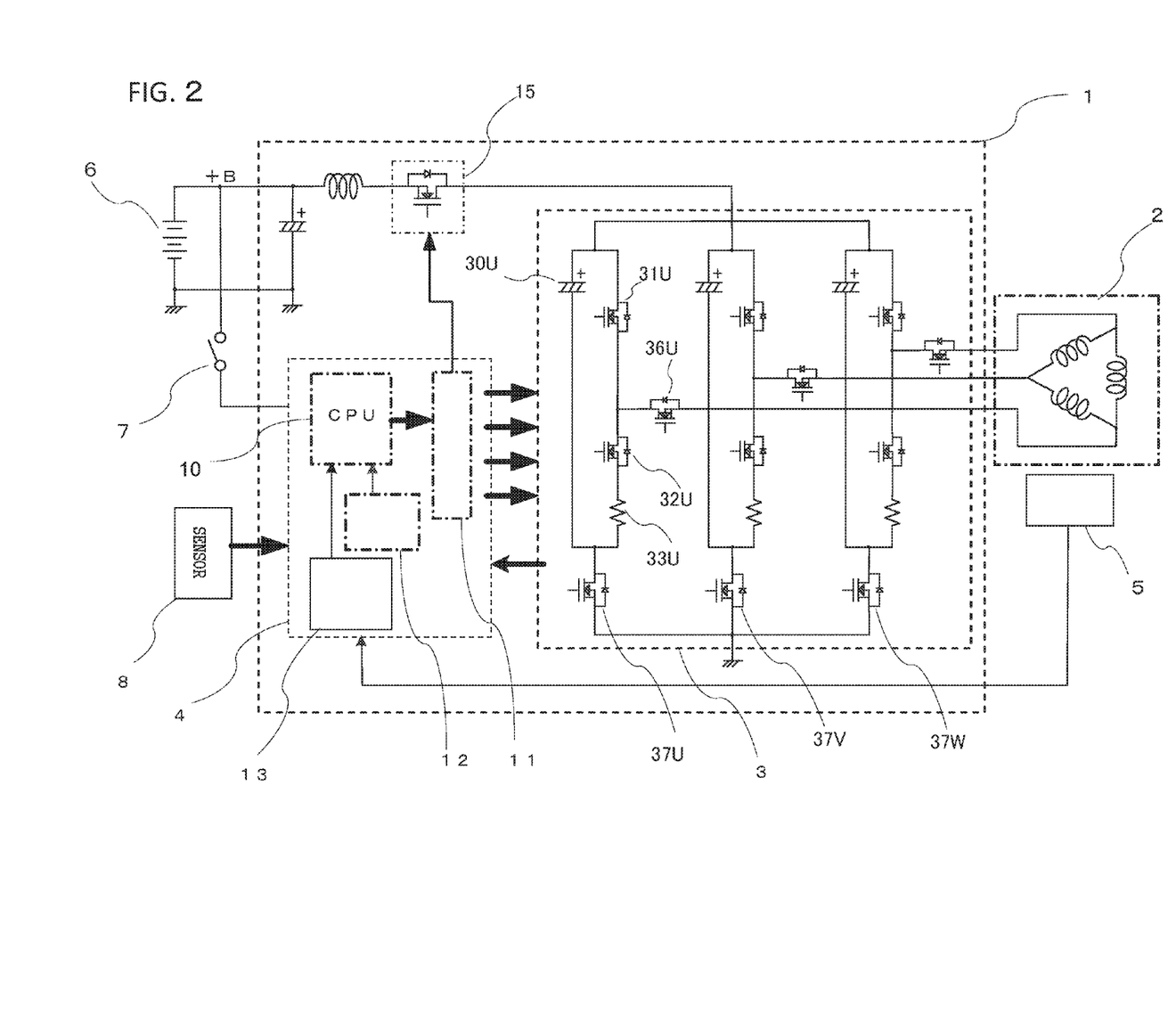
FIG. 2 An overall configuration circuit diagram of an electrically assisted power steering apparatus including an inverter apparatus for three-phase AC motor drive in accordance with a second embodiment.

Next, a second embodiment is described with reference to FIG. 2. FIG. 2 of the second embodiment is different from FIG. 1 of the first embodiment in that the position of a second power supply switching device 37U provided in the inverter circuit 3 is different from that of the second power supply switching device 35U of FIG. 1, and the direction of the parasitic diode of a motor relay switching device 36U is different from that of the parasitic diode of the motor relay switching device 34U of FIG. 1. The remaining parts are the same, so they are denoted by the same reference numerals.

The second embodiment is configured so that the same goal or task results in the same effect when the parasitic diode of the motor relay switching device 36U is in the reverse direction with respect to the first embodiment. Also in the second embodiment, as with the first embodiment, if a short-circuit occurs in either the switching device 31U or 32U for the upper or lower arm circuit, the arm circuit of the U-phase needs to be isolated from the power supply line. For that purpose, the second power supply switching device 37U needs to be inserted into either the upstream or downstream of the switching devices 31U, 32U of the upper/lower arm circuit of the power supply line. In the second embodiment, the parasitic diode of the motor relay switching device 36U is in the direction along which current flows out of the motor winding, so, for example, if a short-circuit failure occurs in the switching device 32U of the lower arm circuit, a current path through the motor relay switching device 36U to the switching device 32U of the lower arm circuit will be generated. This problem can be resolved by inserting the second power supply switching device 37U into the downstream of the switching device 32U of the lower arm circuit and also the downstream of the shunt resistor 33U. However, the shunt resistor 33U is provided for the purpose of current detection, so, if another means for current detection or failure part detection exists, this positional relationship between the second power supply switching device 37U and the shunt resistor 33U is not necessarily required.

Also, in consideration of a short-circuit failure in the capacitor 30U, the downstream end of the capacitor 30U is connected to the upstream of the second power supply switching device 37U, or the connection point of the second power supply switching device 37U and the shunt resistor 33U. With this configuration with the V- and W-phases configured in the same way, when a short-cut failure occurs in any of the switching devices 31U, 32U and the capacitor 30U, only the faulty phase can be isolated to eliminate formation of a closed circuit, which allows continuing motor drive with the remaining two phases and avoiding generation of a brake torque from the faulty phase. That is, a capacitor is placed in parallel with the switching device 31U, 32U of the upper/lower arm circuit of each phase in the inverter circuit 3.

As described above, inserting the second power supply switching device 37U into the power supply line of each phase allows isolating only the faulty phase and continuing motor drive with the remaining phases, and the isolation when a failure occurs can prevent generation of a brake torque.

Third Embodiment

Figure 3:
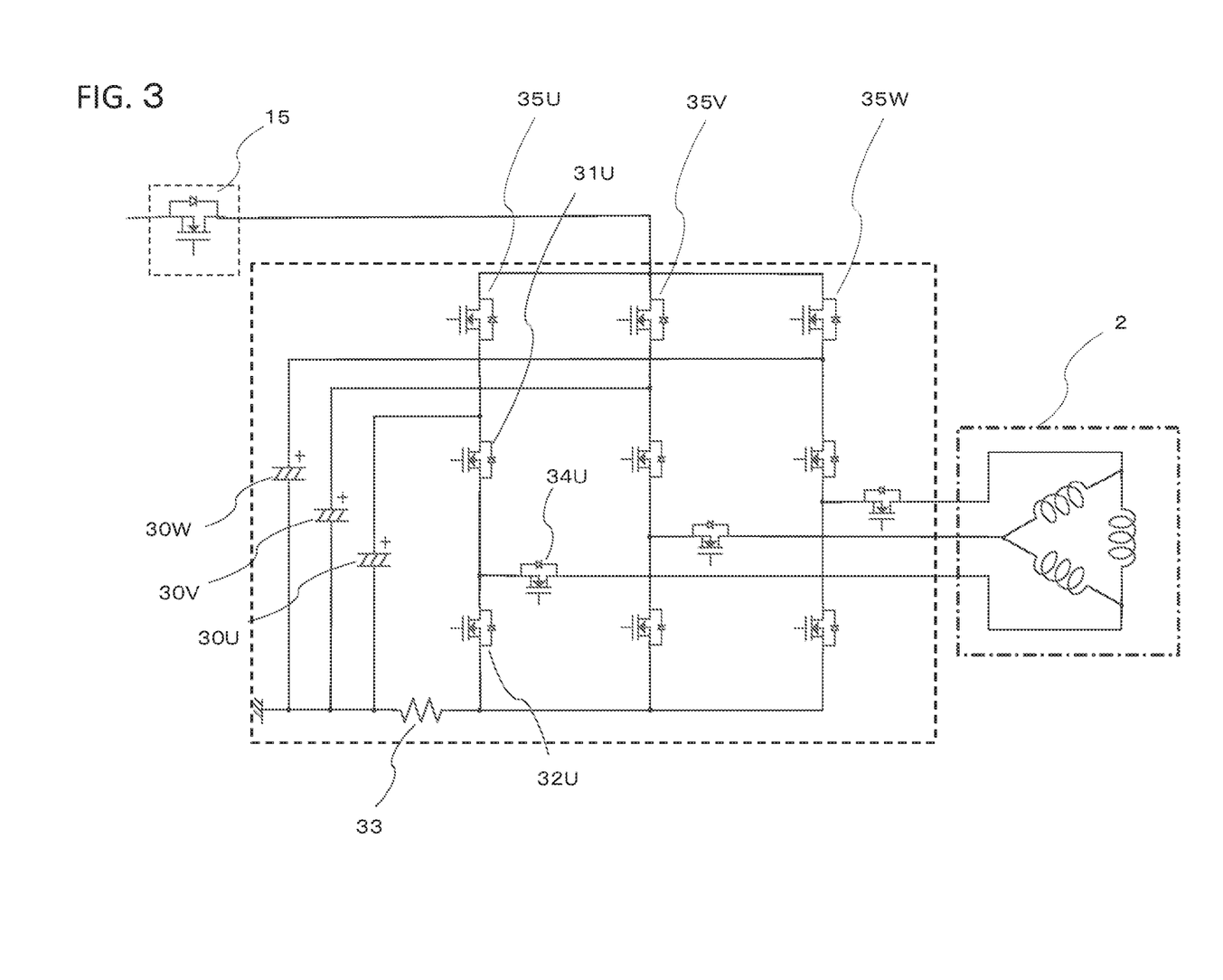
FIG. 3 A partial circuit diagram of an electrically assisted power steering apparatus including an inverter apparatus for three-phase AC motor drive in accordance with a third embodiment.
Figure 4:
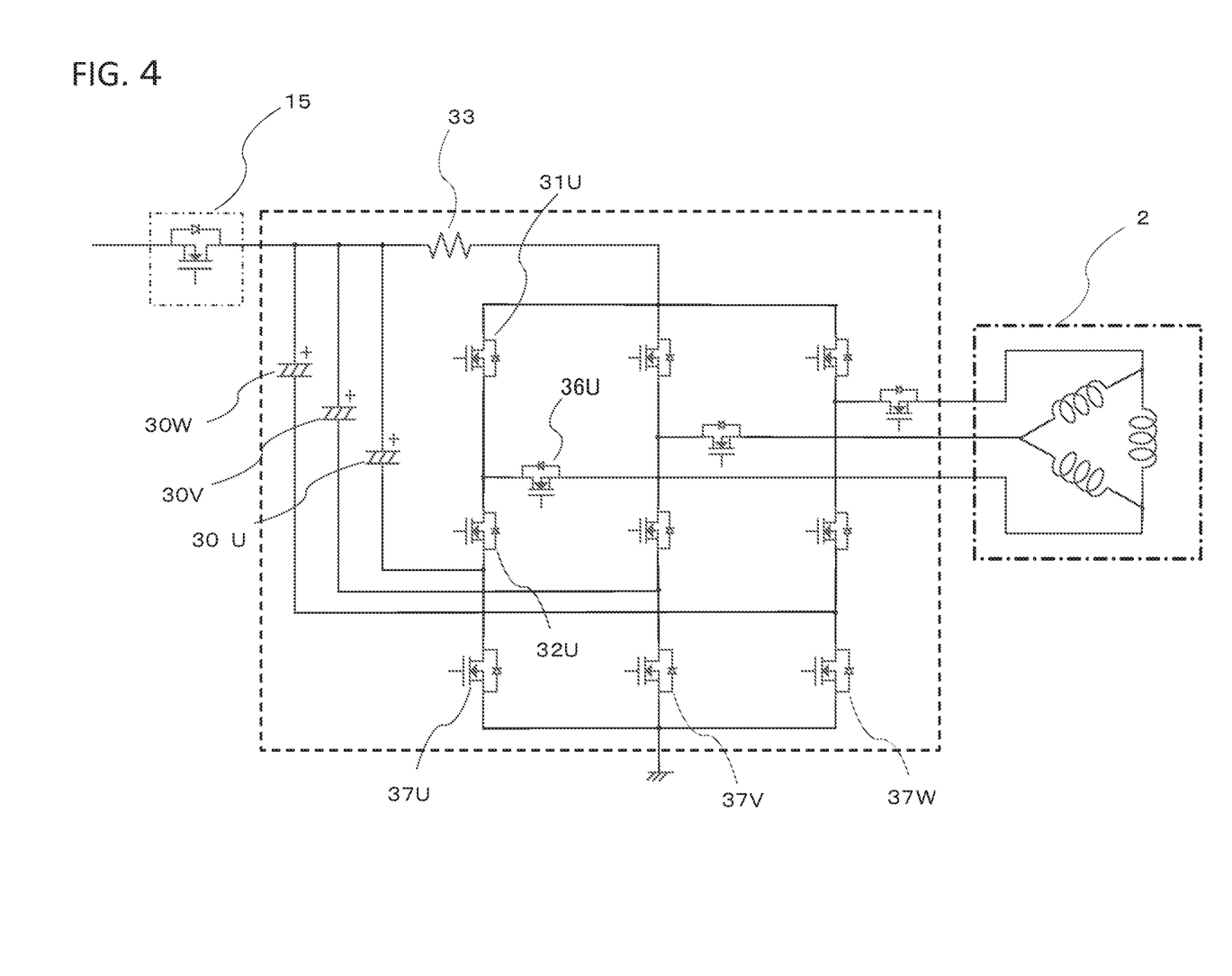
FIG. 4 A partial circuit diagram of an electrically assisted power steering apparatus including an inverter apparatus for three-phase AC motor drive in accordance with the third embodiment.

Next, a configuration including one shunt resistor 33 for current detection is described. Even with only the one shunt resistor 33, the operation may be considered to be similar to the first and second embodiments. Also, depending on the location of the second power supply switching device 35U, 37U, two types of configurations may be considered. FIG. 3 and FIG. 4 are partial circuit diagrams showing the two types of configurations with the one shunt resistor 33 and the second power supply switching device 35 or 37.

FIG. 3 shows the first embodiment in which the second power supply switching devices 35 are placed upstream of the arm circuit of the inverter circuit 3. The one shunt resistor 33 placed downstream of and connected to the three phases of switching devices 32 of the lower arm circuit. Furthermore, the minus (−) terminals of the capacitors 30 are connected to the ground line downstream of the shunt resistor so that even if a short-circuit occurs in any of the capacitors 30, the corresponding phase can be isolated.

Similarly, FIG. 4 shows the second embodiment in which the second power supply switching devices 37 are placed downstream, in this configuration, the shunt resistor 33 needs to be placed most upstream. That is, placing the shunt resistor 33 downstream of the first power supply switching device 15 allows providing the same effect. Furthermore, the plus (+) terminals of the capacitors 30 are connected to the upstream side of the shunt resistor 30.

As described above, even with only the one shunt resistor 33, with the second power supply switching devices 37 placed at an appropriate location, when a short-circuit occurs in the switching device 31U, 32U or even when a short-circuit occurs in the capacitor 30, only the electric path of the corresponding phase can be isolated, which allows motor drive to be continued without generation of a wasted brake torque.

Note that, with only the one shunt resistor 33, current detection for each phase by the shunt resistor 33 can be performed by adjusting the current detection timing, and furthermore, shifting the PWM drive phase for each phase to ensure the secure detection timing improves the acquisition accuracy. Thus, even with only the one shunt resistor 33 to the bus, current detection for any phase can be performed, so a failure for each phase can be detected.

Also, with three shunt resistors or only one shunt resistor, a failure for each phase can also be detected by monitoring the drain-source voltage of the switching devices. In this case, a failure can be detected by detecting an abnormally high drain-source voltage when the switching device is turned on or an abnormally low drain-source voltage when the switching device is turned off, or the like.

Note that the embodiments of the invention may be freely combined or appropriately modified or omitted within the scope of the invention.

The invention claimed is:

1. An inverter apparatus for polyphase AC motor drive comprising: an inverter circuit connected between a power source and a polyphase AC motor for converting power from the power source to polyphase AC power to be supplied to the polyphase AC motor; a first power supply switching device provided between the power source and the inverter circuit for opening/closing the electric path between the power source and the inverter circuit; a motor relay switching device provided between an output point of the inverter circuit for each phase and the polyphase AC motor for opening/closing the electric path between the output point and the polyphase AC motor; a second power supply switching device provided downstream of the first power supply switching device with respect to the power source for each phase of the inverter circuit; and a control circuit for performing switching control of the first power supply switching device, the second power supply switching device, the motor relay switching device and the inverter circuit, wherein a first diode is provided, connected in parallel with the first power supply switching device and in the forward direction with respect to the current supply direction, and a second diode is provided, connected in parallel with the second power supply switching device and in the reverse direction with respect to the current supply direction.

2. The inverter apparatus for polyphase AC motor drive according to claim 1, wherein the inverter circuit includes for each phase an upper/lower arm circuit having a switching device, and the second power supply switching device is placed upstream of the switching device of the upper arm circuit of the inverter circuit.

3. The inverter apparatus for polyphase AC motor drive according to claim 2, wherein a diode is connected in parallel with the motor relay switching device and in the direction to cause current to flow into a phase winding of the polyphase AC motor.

4. The inverter apparatus for polyphase AC motor drive according to claim 3, wherein a capacitor is placed for each phase in parallel with a switching device of an upper/lower arm circuit of each phase in the inverter circuit.

5. The inverter apparatus for polyphase AC motor drive according to claim 4, wherein a shunt resistor for current detection is placed in series with a switching device of an upper/lower arm circuit, and the capacitor is inserted into a phase in which the switching device of the upper/lower arm circuit is connected in series with the shunt resistor, in parallel with the series connection of the switching device and the shunt resistor.

6. The inverter apparatus for polyphase AC motor drive according to claim 2, wherein a capacitor is placed for each phase in parallel with a switching device of an upper/lower arm circuit of each phase in the inverter circuit.

7. The inverter apparatus for polyphase AC motor drive according to claim 6, wherein a shunt resistor for current detection is placed in series with a switching device of an upper/lower arm circuit, and the capacitor is inserted into a phase in which the switching device of the upper/lower arm circuit is connected in series with the shunt resistor, in parallel with the series connection of the switching device and the shunt resistor.

8. The inverter apparatus for polyphase AC motor drive according to claim 1, wherein the inverter circuit includes for each phase an upper/lower arm circuit having a switching device, and the second power supply switching device is placed downstream of the switching device of the lower arm circuit of the inverter circuit.

9. The inverter apparatus for polyphase AC motor drive according to claim 8, wherein a diode is connected in parallel with the motor relay switching device and in the direction to cause current to flow out of a phase winding of the polyphase AC motor.

10. The inverter apparatus for polyphase AC motor drive according to claim 9, wherein a capacitor is placed for each phase in parallel with a switching device of an upper/lower arm circuit of each phase in the inverter circuit.

11. The inverter apparatus for polyphase AC motor drive according to claim 10, wherein a shunt resistor for current detection is placed in series with a switching device of an upper/lower arm circuit, and the capacitor is inserted into a phase in which the switching device of the upper/lower arm circuit is connected in series with the shunt resistor, in parallel with the series connection of the switching device and the shunt resistor.

12. The inverter apparatus for polyphase AC motor drive according to claim 8, wherein a capacitor is placed for each phase in parallel with a switching device of an upper/lower arm circuit of each phase in the inverter circuit.

13. The inverter apparatus for polyphase AC motor drive according to claim 12, wherein a shunt resistor for current detection is placed in series with a switching device of an upper/lower arm circuit, and the capacitor is inserted into a phase in which the switching device of the upper/lower arm circuit is connected in series with the shunt resistor, in parallel with the series connection of the switching device and the shunt resistor.

14. The inverter apparatus for polyphase AC motor drive according to claim 1, wherein a capacitor is placed for each phase in parallel with a switching device of an upper/lower arm circuit of each phase in the inverter circuit.

15. The inverter apparatus for polyphase AC motor drive according to claim 14, wherein a shunt resistor for current detection is placed in series with a switching device of an upper/lower arm circuit, and the capacitor is inserted into a phase in which the switching device of the upper/lower arm circuit is connected in series with the shunt resistor, in parallel with the series connection of the switching device and the shunt resistor.

\* \* \* \* \*